United States Patent
Sciammarella (12)

(10) Patent No.: US 6,281,940 B1
(45) Date of Patent: Aug. 28, 2001

(54) DISPLAY OF PREVIEWED CHANNELS WITH ROTATION OF MULTIPLE PREVIEWED CHANNELS ALONG AN ARC

(75) Inventor: Eduardo A. Sciammarella, New York, NY (US)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 0 days.

(21) Appl. No.: 09/283,369

(22) Filed: Mar. 31, 1999

(51) Int. Cl.[7] .................................................. H04N 5/445
(52) U.S. Cl. ........................... 348/564; 348/569; 725/38; 725/56
(58) Field of Search ..................................... 348/564, 563, 348/565, 569, 906; 725/39, 40, 41, 53, 56, 37, 38; H04N 58/445, 5/45

(56) References Cited

U.S. PATENT DOCUMENTS 6,028,600 * 2/2000 Rosin ..................................... 348/38

* cited by examiner

Primary Examiner—Sherrie Hsia
(74) Attorney, Agent, or Firm—Christopher M. Tobin; Harold T. Fujii (57) ABSTRACT

Information corresponding to previewed channels is displayed using a sequential arrangement having a main channel location and several remaining channel locations. A currently previewed channel resides in the main channel location. The channels move along the sequential arrangement and into the main channel location for previewing. An arc shaped arrangement having the main channel location at an intermediate point allows channels to progress from one side of the arc, then into the main channel location for previewing, then to the other side of the arc. A jog dial can be rotated to cause the previewed channels to rotate along the arc. Thus, the user can cycle through available channels or a subset of channels by merely holding the jog dial in a given position.

20 Claims, 8 Drawing Sheets

DISPLAY OF PREVIEWED CHANNELS WITH ROTATION OF MULTIPLE PREVIEWED CHANNELS ALONG AN ARC

CROSS REFERENCE TO RELATED APPLICATIONS

This application is related to application Ser. No. 09/283,370, entitled "CHANNEL PREVIEW WITH RATE DEPENDENT CHANNEL INFORMATION," filed on Mar. 31, 1999 by Eduardo A. Sciammarella and Andrew M. Proehl, the contents of which are hereby incorporated by reference.

BACKGROUND OF THE INVENTION

1. Field of the Invention

This application relates generally to displaying channel information, and more particularly to displaying information corresponding to previewed channels.

2. Description of the Related Art

Home entertainment continues to change at a rapid pace, with ever increasing content becoming seemingly available. For example, cable or satellite broadcasting system viewers may now expect to select programming from among hundreds of available channels. Also, the convergence of computer network architectures and traditional broadcast entertainment promises to further increase the availability of information.

Typically, a user may preview available channels in sequential fashion, or may manually jump to a given channel, with each previewed channel occupying the entirety of the display. Various electronic program guides (EPGs), such as those provided in a cable television system or satellite system, have also become available to preview channels. Specifically, EPGs typically provide textual programming information about available channels. Many EPGs display a grid detailing certain programming information for the channels available for viewing. The columns in the grid may represent various programming times, while the rows in the grid may represent various available channels. The intersection of rows representing the available channels with the column for a given time provides the programming information for that time.

While conventional EPGs have been helpful in compiling channel information, they may be inadequate interfaces for users navigating numerous channels, and do not efficiently convey information to the user.

SUMMARY OF THE INVENTION

In accordance with the present invention, methods and apparatus convey information corresponding to previewed channels using a display configuration having a plurality of channel information locations arranged in a sequence. One of the channel information locations is the main channel location, and the other channel locations may be referred to as remaining channel locations. When a user is previewing channels, information for both the currently previewed channel and other channels is displayed. The currently previewed channel resides in the main channel location, and the other channels reside in the remaining channel locations. Channels to be previewed move along the sequence of channel information locations until they reach the main channel location as the currently previewed channel.

In one embodiment, the channel information locations are arranged in an arc, with the main channel location residing at an intermediate point along the arc, and the remaining channel locations residing at first and second sides of the arc that are separated by the intermediate point. Thus, as channels to be previewed rotate along the arc, they progress along the first side, then to the main channel location, and then to the second side. Alternatively, the channels to be previewed progress from the second side, then to the main channel location, then to the first side.

Preferably, a remote control jog dial is used to provide control signals which cause the channels to be previewed to rotate along the sequence of channel information locations. Thus, when used in conjunction with the arc embodiment, maintaining the jog dial in a rotated position causes channels to continue to rotate along the arc such that a series of channels move into the main channel location for preview by the user. Using the jog dial allows the user to preview channels while maintaining the jog dial in a certain position. Such a maneuver would not require the user to continue to look for control buttons on the remote control, thus allowing the user to concentrate on the display as channels are being previewed. Preferably, the rotation of the jog dial matches the rotation of the channels to be previewed. Specifically, if the jog dial is maintained in a position where it is rotated clockwise, then channels to be previewed rotate clockwise along the arc. Similarly, if the jog dial is maintained in a counter-clockwise position, then channels to be previewed rotate counter-clockwise along the arc.

The channels to be previewed may be a full set of the channels available for viewing, or may be a subset, such as a list of the user's favorites or all of the available channels that have programming from a specific category such as sports, movies, or subcategories such as comedies, dramas, baseball, or any subset of available channels.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

Certain embodiments of the present invention described herein may be used with a direct broadcast satellite system.

However, the ordinarily skilled artisan will recognize that other broadcast systems and formats, including without limitation cable and terrestrial systems, digital televisions, computer systems, and combinations of all such systems may utilize the method and apparatus of the present invention. Furthermore, in the following description, for purposes of explanation, numerous details are set forth, such as flowcharts and system configurations, in order to provide an understanding of an embodiment of the present invention. However, it will be apparent to one skilled in the art that these specific details are not required in order to practice the present invention.

Figure 1:
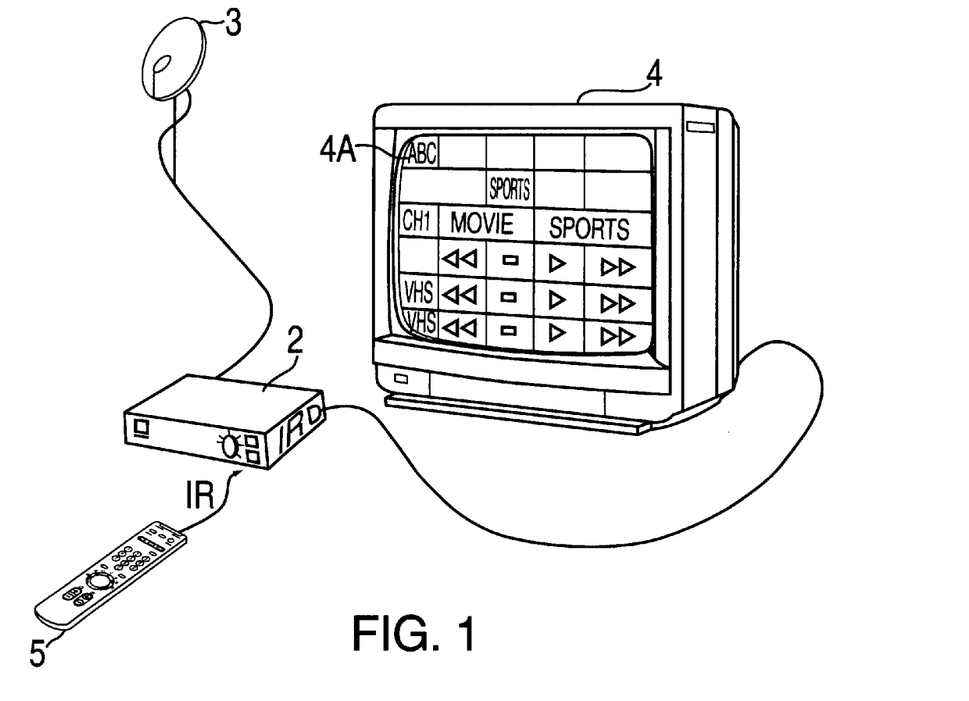
FIG. 1 is a schematic diagram illustrating an embodiment of a digital satellite system.

FIG. 1 is a schematic diagram illustrating a Direct Satellite System (DSS), which is an example of a system that may be used in conjunction with the present invention. The system has an antenna 3, an IRD (Integrated Receiver/Decoder) 2, a remote control 5, and a display device 4. Signals are transmitted by a satellite transponder and received by the antenna 3. The IRD 2 also includes circuitry for decoding the signals received by the antenna 3, and for appropriately tuning or filtering signals so as to provide a display output according to user's selections and desires. Typically, the satellite transponder transmits packetized data in a time shared manner at a predetermined frequency. The IRD 2 receives the packetized data through the antenna 3, and then demodulates and decodes the data to produce signals appropriate for producing the display 4a.

The IRD 2 may also be referred to as a set top box. Also, the functionality of the IRD 2 may be provided within the television housing. The IRD 2 may also be an open configuration that allows receipt from various programming sources (e.g., cable, satellite, conventional television, HDTV, etc.).

Figure 2:
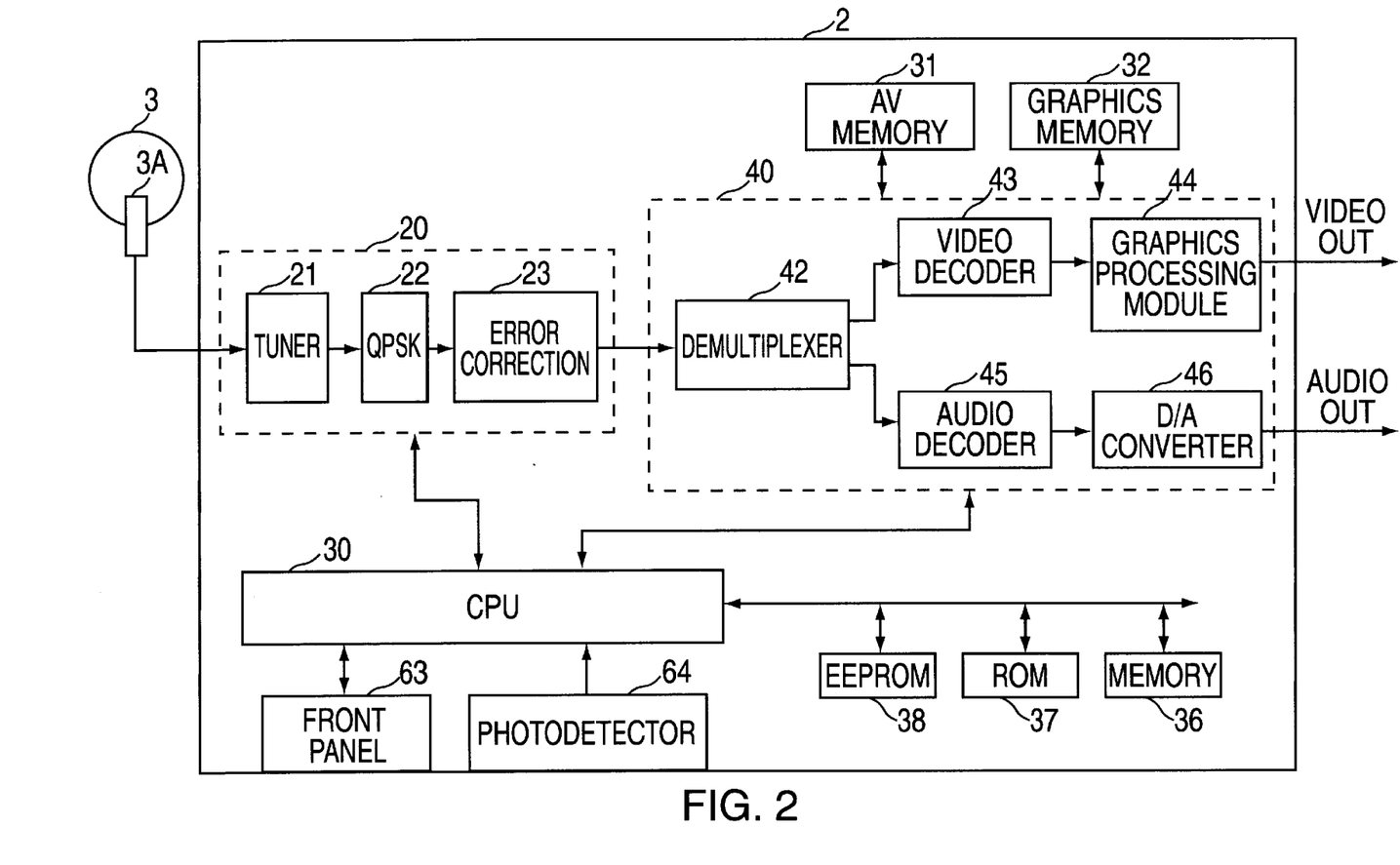
FIG. 2 is a block diagram illustrating an IRD including an embodiment of previewing channels in accordance with the present invention.

The block diagram of FIG. 2 illustrates an embodiment of an IRD 2 in further detail. As described above, the antenna 3 receives an encoded data signal sent from a satellite. The antenna 3 has a low noise block down converter 3a (LNB), which converts a frequency of a signal sent from the satellite to another frequency. This signal is decoded by the IRD 2. For IRD 2 embodiments receiving programming from other sources, other appropriate front end circuitry would be provided, such as a network interface for Internet sources, or an NTSC decoder for conventional television.

The IRD 2 includes a front end 20 having a tuner 21, quadrature phase shift keying (QPSK) demodulation circuit 22, and an error correcting circuit 23. A radio frequency (RF) signal output from the LNB 3 a is supplied to the tuner 21, the tuner 21 output is supplied to the QPSK demodulation circuit 22 for demodulation, and the QPSK demodulation circuit 22 output is suppled to the error correcting circuit 23 for error correction.

The received data is an encoded packetized data stream that is passed to an AV processing module 40 that includes a demultiplexer 42, video decoder 43, audio decoder 45, graphics processing module 44 and D/A converter 46. The AV processing module 40 is in communication with AV memory 31 and EPG/Graphics memory 32, as well as the CPU 30. The demultiplexer 42 receives the packets of data from the error correcting circuit 23 and directs portions of the data stream as appropriate for processing, buffering data in the AV memory 31 or EPG/Graphics memory 32 as needed. Typically, the multiplexer 42 uses header information provided in the data stream to identify different types of data. For example, the header distinguishes which packets comprise video, audio and EPG data. Data that is identified as video data is provided to the video decoder 43, audio data to the audio decoder 45, and EPG data to the EPG/Graphics memory 32. The data format can be that specified by the Motion Pictures Expert Group (MPEG), including MPEG2 and MPEG4. Various conventional MPEG data parsing circuitry or software can be used for the demultiplexer 42, and conventional decoding techniques can be used for the decoders 43, 45.

The video decoder 43 decodes the video signal received from the demultiplexer 42. Also, as indicated, AV memory 31 may buffer video data during processing by the video decoder 43. The decoded signal is provided to the graphics processing module 44, which converts the signal to the format required for the display 4. For example, the graphics processing module may include a National Television System Committee (NTSC) encoder for conversion to luminance (Y) and chroma (C) signals which can be output through buffer amplifiers (not shown) as an S video signal. The graphics processing module 44 also provides graphics overlays, such as those provided when displaying an EPG over a video image, and also may provide a cursor layer for facilitating the receipt of cursor based input. For example, the graphics processing module 44 may access EPG data in the EPG/graphics memory 32 and display such data over a video image for a currently tuned channel, or may display such data over another graphical layer. Additionally, the graphics processing module 44 may grab still frames for currently tuned channels, store them in the EPG/Graphics memory 32, and later display the still frames along with the video for a subsequently previewed channel as provided in certain embodiments of the present invention, described further below. Conventional pixel mixing circuitry or software may be used for displaying the various image and graphics layers.

The audio decoder 45 decodes the digital audio signal, and the AV memory 31 may buffer data for processing by the audio decoder 45. The decoded digital audio signal is converted into an analog audio signal by D/A converter 46, and output through one or more amplifiers (not shown).

The various components of the AV processing module 40 are preferably provided as software executed by the CPU 30. However, the AV processing module 40 may be software, hardware, firmware, or any combination thereof. Also, in lieu of sole CPU 30 instruction execution, the AV processing module 40 (or any module in the IRD 2) may be a separate integrated circuit, and may have separate processing capabilities, such as those provided by an embedded RISC processor.

The CPU 30 executes instructions and uses data to provide functionality including the channel preview functionality of the present invention. Instructions to be executed by the CPU 30 are stored in ROM 37 and memory 36; however, such code may alternatively be stored in other types of memory. The CPU 30 also accesses data such as that stored in memory 36 and electrically erasable programmable read-only memory (EEPROM) 38, and processes user input received via the front panel 63 and the photodetector circuit 64. For example, the CPU 30 accesses user settings and preferences for processing information and configuring the system. The user settings may be stored in non-volatile memory, such as EEPROM 38, so that they are retained when power to the system is interrupted. The EEPROM 38 may also be updated to provide new IRD 2 control programs. A hard disk (not shown) may also be used to store data and code as needed.

Preferably, the CPU 30 maintains a list of pointers stored in memory 36 for the programming information stored in the EPG/Graphics memory 32 (although various memories 31, 32, 36 are shown to be separate, they can reside in a single memory if desired). Thus, when the user requests the display of an EPG on the screen or a switch between a broadcast and an EPG, the CPU 30 as instructed by the graphics processing module 44 accesses the pointers stored in the memory 36, the corresponding EPG data stored in the EPG/Graphics memory 32, and formats the EPG data to appropriately update the display. Some EPG data, such as that used to provide the look of the EPG, may originate in IRD 2 while other EPG data, such as the content portion may originate from the data transmitted to the IRD 2 as described above. Alternatively, all of the EPG data may originate in the data transmitted to the IRD 2, or may originate from any source.

Figure 3:
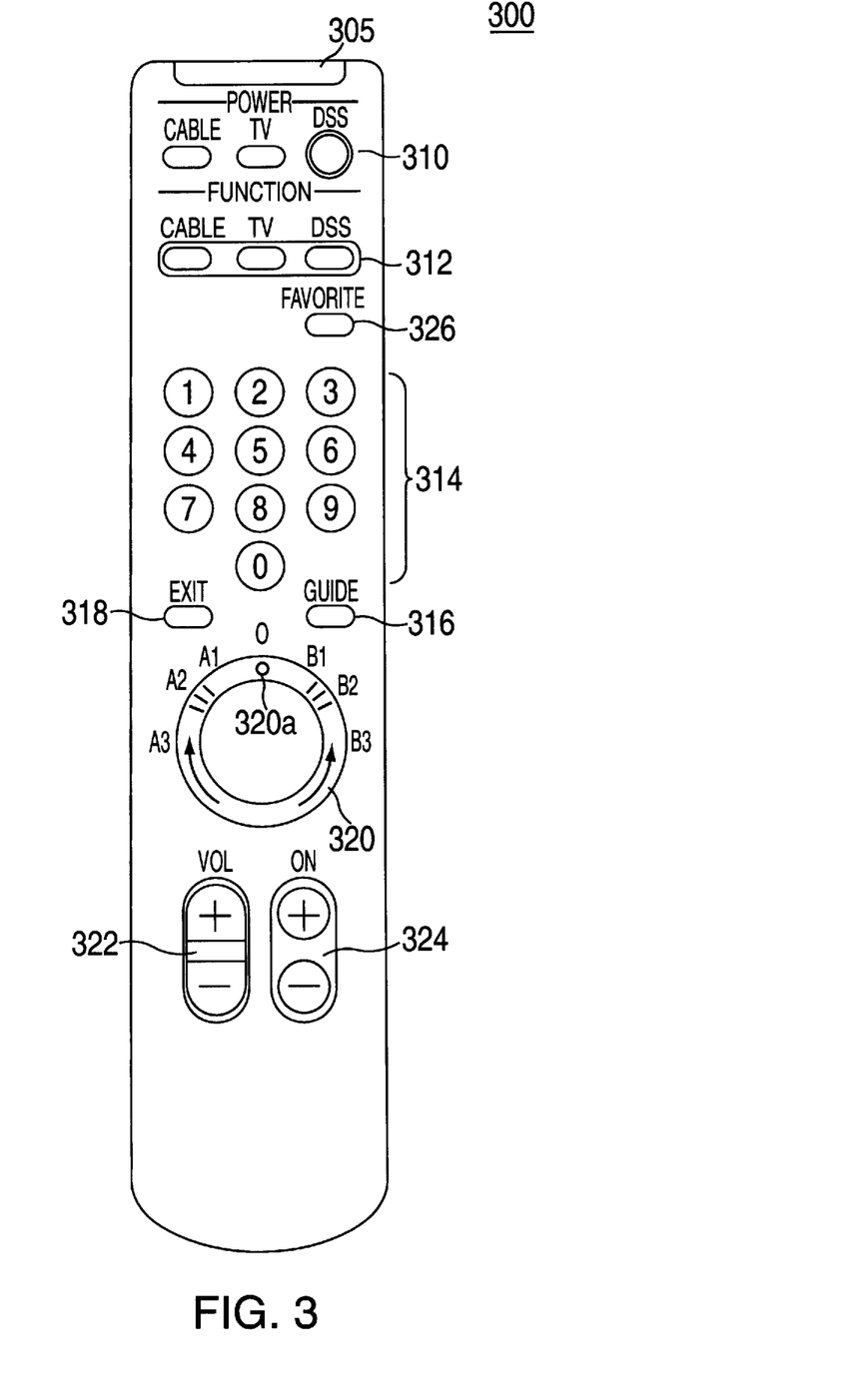
FIG. 3 is an illustration of a remote control for providing control signals used in accordance with the present invention.

FIG. 3 shows an example of a remote control 300 which allows the user to transmit control signals to the IRD 2. The remote control 300 may also be referred to as a remote controller, or a REMOTE COMMANDER. The remote control 300 has an infrared transmitting device 305, and various control buttons 310–324 for providing corresponding signals to be transmitted to the IRD 2. Specifically, the remote control 300 includes power buttons 310 to turn on devices for cable, terrestrial broadcast television (TV), and satellite programming. Alternatively, as described previously a single IRD 2 or set top box could service the various origins of programming, in which case a remote control 300 would likely not include separate power buttons.

Function buttons 312 allow the remote control 300 to alternately control the receivers for cable, TV or satellite. Additionally, the numeric buttons 314 allow manual entry of channel numbers, the channel button 324 allows the user to sequentially navigate among channels, and the volume button 322 allows the user to adjust the audio volume. The guide button 316 allows the user to enter a programming guide mode, while the exit button 318 may be used to exit the programming guide for a return to the viewing mode. A favorite button 326 allows the user to enter a mode wherein a selected subset of available channels may be previewed or otherwise manipulated by the user. These channels may be selected using conventional menus and corresponding commands, using the illustrated control buttons, or other conventional menu and related control buttons (not shown).

The jog dial 320 is a rotating control button that allows the user to provide various control signals. The jog dial 320 rotates both clockwise and counterclockwise, and has a position indicator 320a which resides on the rotating dial and indicates the current position of the dial along with stationary markings (O, B1–B3, A1–A3). The default or rest position is typically that shown in FIG. 3, where the indicator 320a points to position "O". The user may also rotate the jog dial 320 clockwise such that the indicator 320a points to position R1, then R2, then R3, or counterclockwise such that the indicator 320a points to position F1, then F2, then F3. When used in connection with this embodiment of the present invention, these different jog dial positions 320a can provide control signals which dictate the direction for previewing channels, as is described further below. The various positions can also dictate the rate of channel preview, as well as the amount of information conveyed to the user, wherein slow rates allow more information to be displayed. These rate and variable information aspects are described further in the above referenced related application Ser. No. 09/283,370, entitled "CHANNEL PREVIEW WITH RATE DEPENDENT CHANNEL INFORMATION." Although a jog dial 320 is described as the preferred mechanism for controlling the preview of channels, the artisan will recognize alternative input devices.

Figure 4:
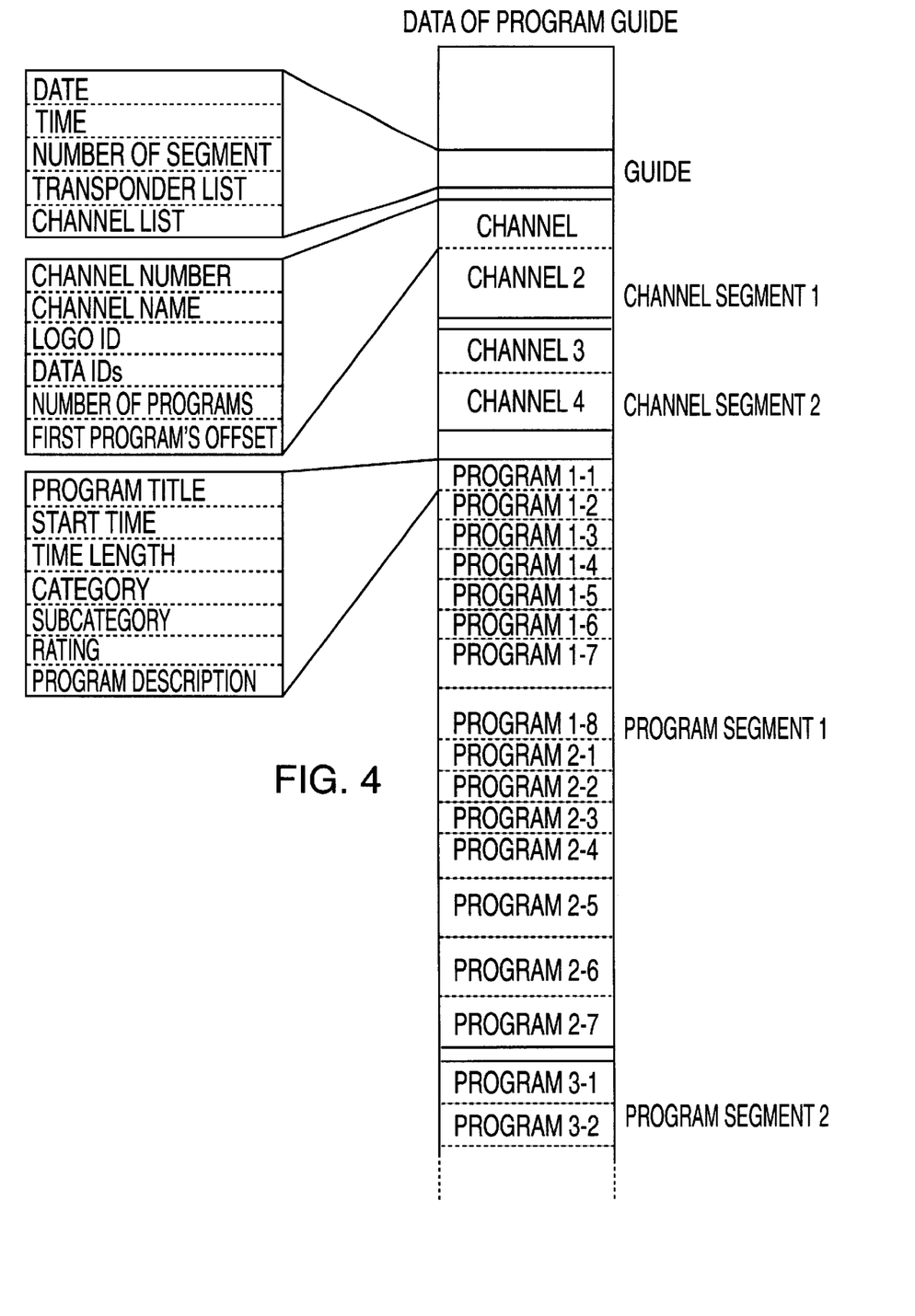
FIG. 4 is a schematic diagram illustrating an exemplary data table including channel information.

FIG. 4 is a schematic diagram illustrating EPG data, which is an example of some of the channel information that can be displayed in accordance with the present invention. The shown EPG data includes guide data, channel identification data, and program data. The guide data is general information, such as the current date and time. Additional information, such as transponder identification information, channel list, and segment information may also be included in the guide data. The channel identification data includes data relating to channels, such as the channel number, channel name (i.e., the call sign of a broadcast station), logo ID (i.e., an identification of the channel logo), data ID, which is an identification of a channel number of MPEG video data or MPEG audio data, number of programs, which identifies the number of programs to be transmitted on a channel during a predetermined time frame, and first program offset which identifies the offset from the header to the first channel data in a segment.

The program data includes the program title, start time of the program, time length of the program, program category such as movies, news, sports, etc., program subcategory such as drama, horror, children's for the movies category, or baseball, basketball, football for the sports category, the program rating and a program description that provides a detailed description of the program. The various program entries for each channel (e.g., 1-1 through 1-8) may be provided in the sequence with which they are to be shown, or in any desired fashion.

Figure 5:
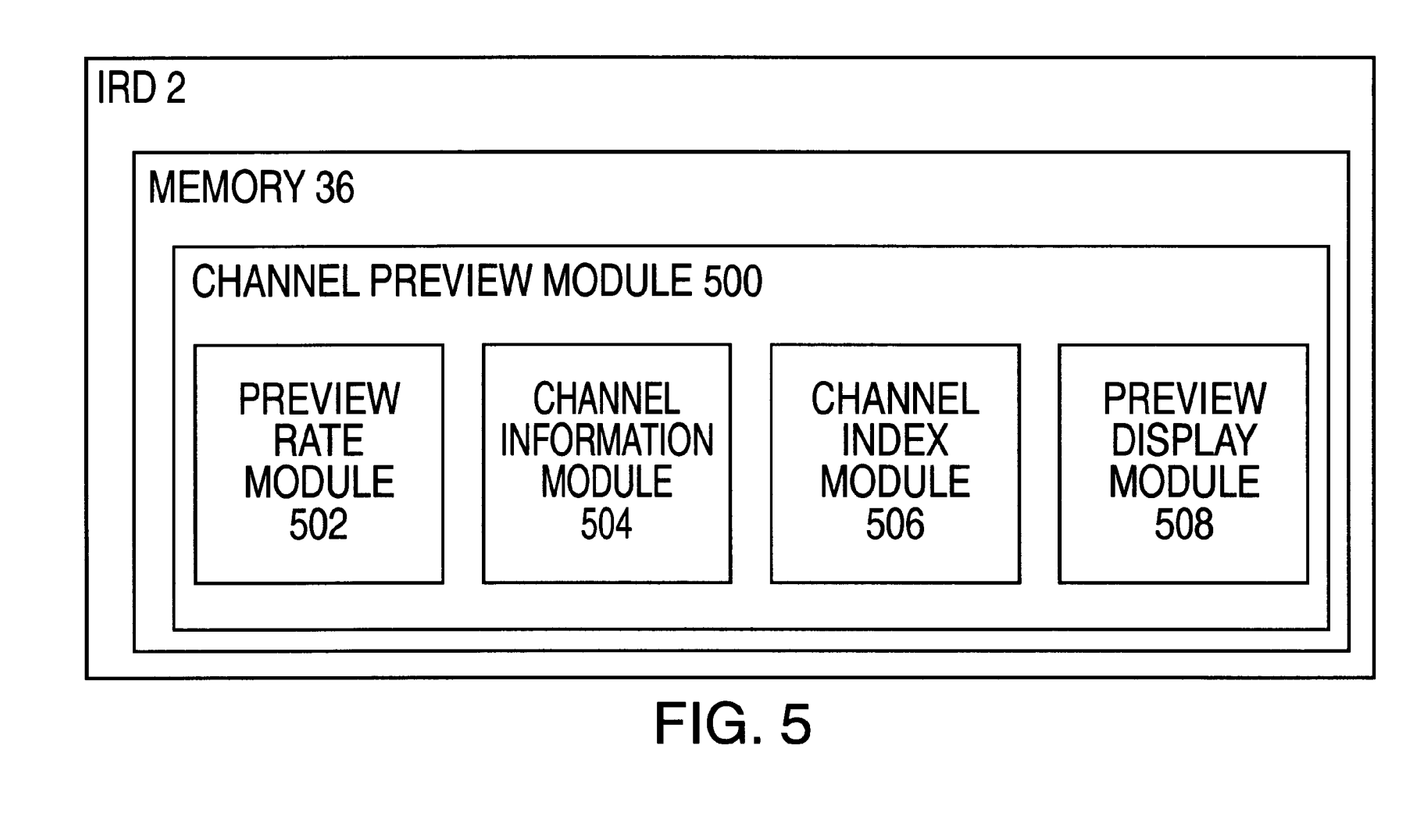
FIG. 5 is a block diagram illustrating an embodiment of a channel preview module in accordance with the present invention.

Referring now to the block diagram of FIG. 5, an embodiment of a channel preview module 500 is shown to reside within the memory 36 of the IRD 2, and to include a preview rate module 502, channel information module 504, channel index module 506, and preview display module 508. The channel preview module 500 receives control signals originated from the remote control, and in response to such control signals causes the display to be updated with programming information such as the EPG data, or other channel information such as video and audio for previewed channels, channel logos, and the like.

The preview rate module 502 receives control signals and determines the current rate for previewing channels, and provides the channel preview rate for the channel information module 504, which determines the level of detail for previewed channels dependent upon that rate.

The channel index module 506 maintains the list of channels being previewed, which may comprise all available channels, or a subset of the available channels such as favorite channels. Other subsets, such as those that currently have particular programming (e.g., movies (or subsets dramas, comedies) or sports (or subsets baseball, football)), can be indexed for preview. The information for compiling these subsets can be obtained from user input and/or particular fields in the EPG data, or elsewhere.

Finally, the preview display module 508 provides the display configuration for previewing channels. The preview display module 508 is in communication with the channel information channel 504, and includes routines which determine how the previewed channels will be displayed. To carry out its functionality, the channel information module 504 may implement conventional graphical and display driving functionality of the graphics processing module 44, such as providing still images and corresponding graphical and textual information for previewed channels on graphical layers that can be simultaneously displayed using conventional pixel mixing techniques. The front end 20 and AV processing module 40 can also be used by the preview display module 508 to provide video and audio for a currently previewed channel in a particular display location.

Figure 6:
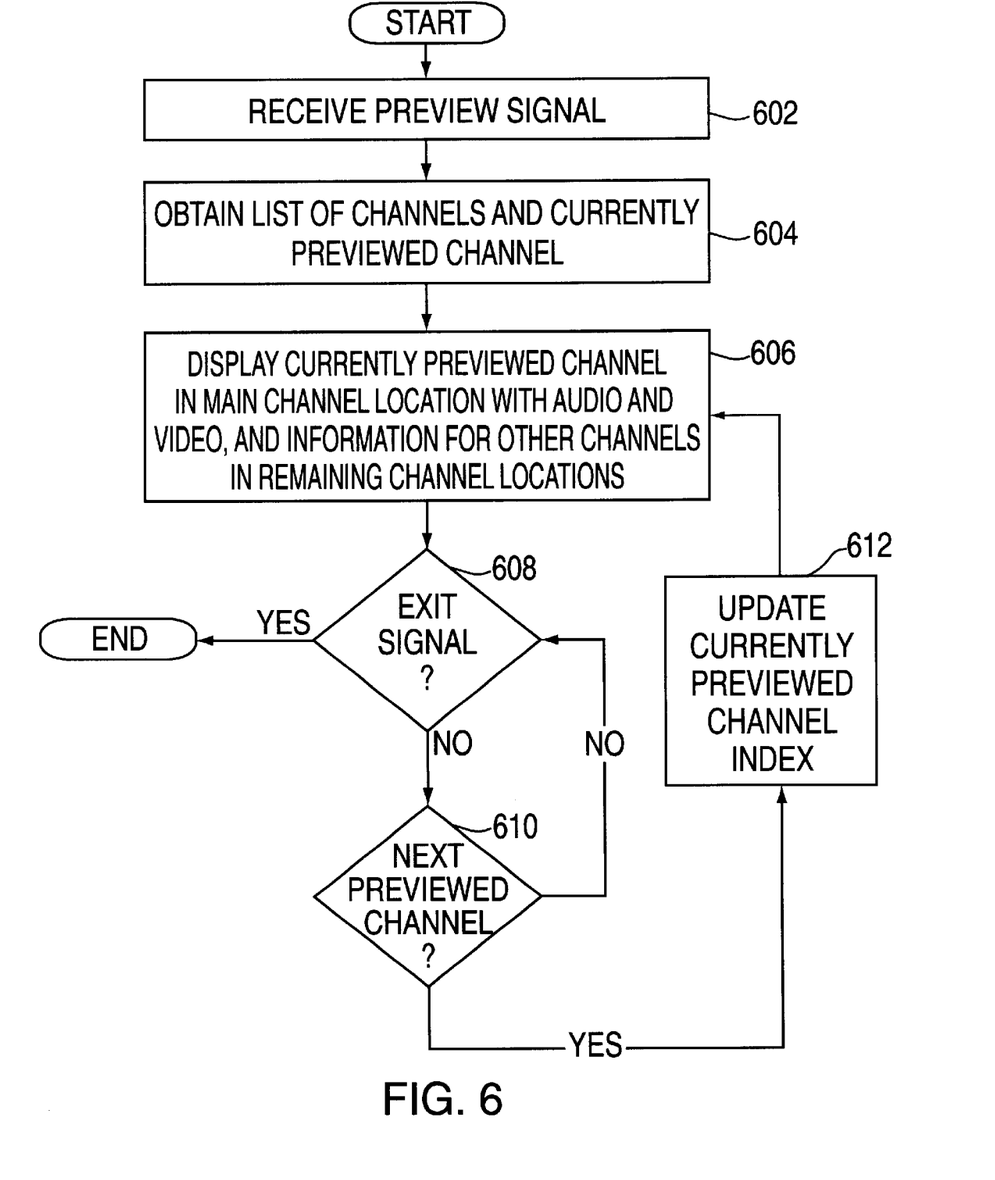
FIG. 6 is a flow chart illustrating an embodiment of a method for displaying channel information in accordance with the present invention.
Figure 7A:
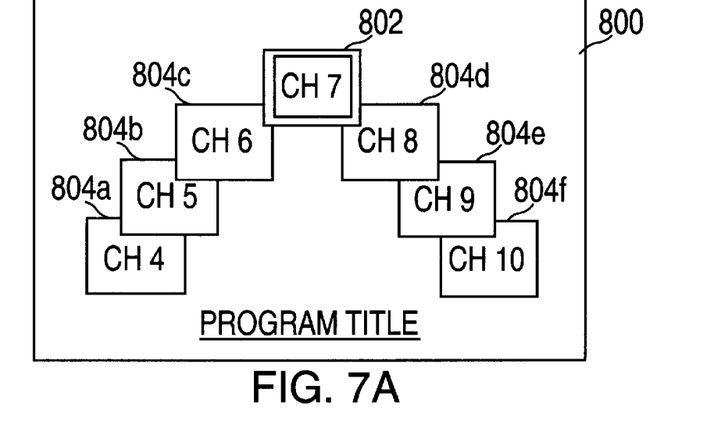
FIGS. 7A–C are illustrative diagrams showing an embodiment of a sequential arrangement of channel information locations used to preview channels in accordance with the present invention.
Figure 7B:
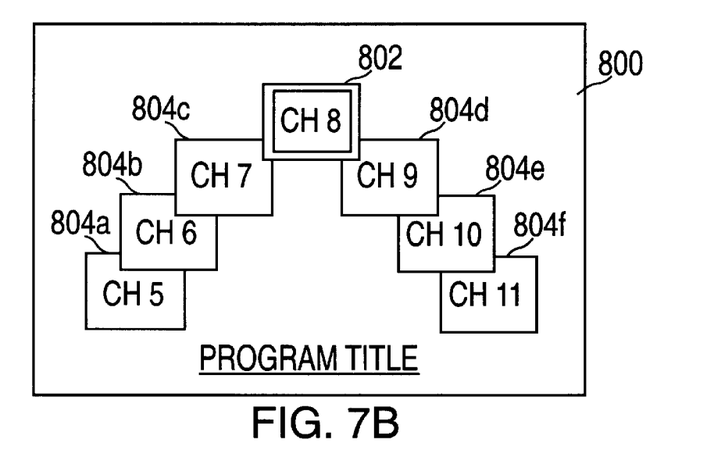
Figure 7C:
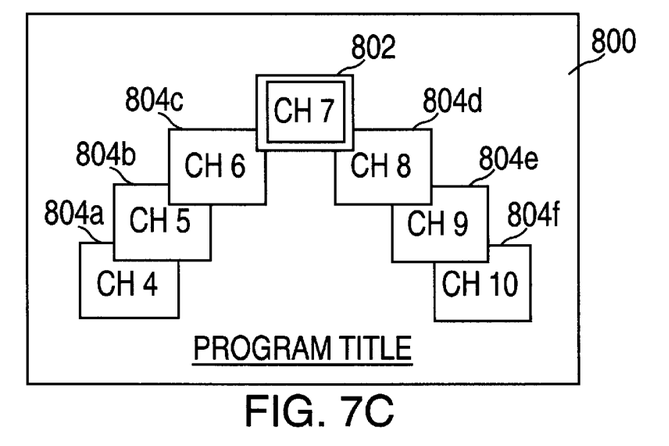

The flow chart of FIG. 6 and the diagrams of FIGS. 7A–7C illustrate an embodiment of displaying previewed channels in accordance with the present invention. In step 602, a preview signal is received by the channel preview module 500, whereupon the preview mode is entered. The preview signal may result from various controls, such as when the user hits the remote control guide button (316, FIG. 3), or simply when the user manipulates the jog dial out of the O position while in the normal viewing mode. In the preview mode, channel information for numerous channels is displayed for the user. In step 604, a list of channels and the identification of the currently previewed channel is obtained, such as from the channel index module 506. Preferably, the currently previewed channel is the channel watched by the user before entry into the preview mode. Thus, if the user was watching channel 7 upon entering the preview mode, then channel 7 would be the currently previewed channel. Otherwise, a default or preset channel can be provided as the currently previewed channel.

In step 606, the currently previewed channel is displayed in a main channel location, while other channels are displayed in remaining channel locations. The illustrative diagram of FIG. 7A shows an embodiment for displaying previewed channels in accordance with the present invention. Preferably, previewed channels are arranged in a sequence having a plurality of channel information locations. One of those channel information locations is referred to as the main channel location 802, and the other channel information locations are referred to as remaining channel locations 804a–f. The currently previewed channel, which is channel "7" in FIG. 7A, resides in the main channel location 802. Audio and video are provided for the currently previewed channel. Additionally, other channel information such as the program title (denoted "program title" in the FIG. 7A) can be provided for the currently previewed channel, residing in the main location 802. Channels residing in the remaining channel locations 804a–f would not have audio and video; however, identifying information such as the channel number, channel logo, and a still image are preferably provided.

If an exit signal is received (608), then the preview mode terminates, and the user is provided with a full screen view of the currently previewed channel in a normal viewing mode. The exit signal can be provided directly by the user, or can result where the user leaves the currently previewed channel in the main channel location 802 for a given time period.

As described previously, the video and audio for the currently previewed channel in the main channel location 802 can be provided in conventional fashion by tuning to that channel. Additionally, graphical and textual channel information can be provided by accessing such information from the EPG data or elsewhere, and using layering and pixel mixing techniques to concurrently display the various channel information locations 802, 804a–f. Further, still images can be frames from video corresponding to the channel, or can be any still image that identifies, for example, the channel or programming on the channel.

Still referring to FIG. 7A, preferably the channel information locations 802, 804a–f are arranged in an arc, with the main channel location 802 residing at an intermediate point along the arc. Also, some remaining channel locations 804a, 804b, 804c reside at one side of the arc, while other remaining channel locations 804d, 804e, 804f reside at another side of the arc, separated from the intermediate point. Also, as shown in FIG. 7A, the main channel location 802 can reside at the arc apex, around the upper middle portion of the display 800, so that the user can focus primarily on the currently previewed channel.

If an exit signal is not received (608) and a signal requesting the next previewed channel is received (610), then the currently previewed channel index is updated (612), and the display is updated according to the index update. Preferably, the remote control jog dial 320 is used to provide the control signals which prompt display updates in the preview mode. Thus, when used in conjunction with the arc embodiment illustrated in FIG. 7, maintaining the jog dial 320 in a rotated position causes channels to be previewed to move along the arc and successively move into the main channel location 802. Preferably, rotating the jog dial in the counter-clockwise direction (towards the "A" positions) causes the channels to be previewed to rotate counter-clockwise. For example, referring to channels 7 and 8 shown in FIGS. 7A and 7B, this causes channel 8 to rotate counter-clockwise from one remaining channel location 804d into the main channel location 802, and channel 7 to rotate out of the main channel location 802 and into a remaining channel location 804c. Once present in the main channel location 802, the audio and video for channel 8 would be provided, along with the program title and any other desired channel information. Some channel information, such as a still image, the channel number, and a channel logo, could still be provided for channel 7, but the audio and video would no longer be provided. Additionally, when channel 7 and 8 rotate, the other previously displayed channels (5, 6, 9, 1 0) similarly rotate counter-clockwise into new remaining channel locations 804a, 804b, 804d, 804e, and previously un-displayed channel 11 moves into the rightmost remaining channel location 804f.

By maintaining the jog dial 320 in a counter-clockwise rotated position, the channels would continue to rotate in the same direction along the arc. A single preview rate could be provided, or different jog dial positions could be used to provide different rates of preview (the rate with which channels rotate along the arc). Specifically, position A1 could provide a relatively slow preview rate, and A2 and A3 could provide progressively faster scrolling rates.

The amount of channel information provided to the user can depend upon the rate with which the channels are being previewed. At relatively slow rates, the most information can be provided, while at relatively fast rates, the least information can be provided. Thus, for example, at the slowest rate (A1), audio and video along with the channel number, logo, and program title could be provided; at a faster rate (A2), the channel number and logo could be provided; and at a still faster rate (A3), merely the channel number could be provided. This is described further in the above referenced related application Ser. No. 09/283,370, entitled "CHANNEL PREVIEW WITH RATE DEPENDENT CHANNEL INFORMATION."

The jog dial 320 can also be rotated clockwise to cause the channels to be previewed to rotate along the arc in the clockwise direction. Referring to FIGS. 7B and 7C, this would cause the channel residing in remaining channel location 804c to rotate into the main channel location 802. Here, since channel 7 resided in that location 804c, it would then return to the main channel location 802. Similar to counterclockwise rotation, by maintaining the jog dial 320 in the appropriate position, channels will continue to move along the arc to rotate into the main channel location 802 for preview. As with the A positions of the jog dial 320, various positions B1–B3 can dictate the preview rate and the corresponding amount of provided channel information.

As described above, the channels to be previewed may be the set of all available channels, or a subset. The subset can be programmed by the user using the favorites button functionality. Thus, a sequence of favorite channels would appear in the various channel information locations 802, 804a–f in the preview mode, with cycling among those favorite channels using the same preview mode controls described previously.

Alternatively, the subset of channels displayed in the preview mode can be determined based upon the type of channel, or the type of programming currently carried by the channel. Thus, if the user wants to preview channels having sports, only those channels would be displayed. This function can be provided by obtaining the data from appropriate fields in the EPG data. Alternatively, subsets can be defined by other categories (movies, etc.) or by subcategories (baseball, football). Various alternatives will be recognized for displaying channel subsets in the preview mode.

Figure 8A:
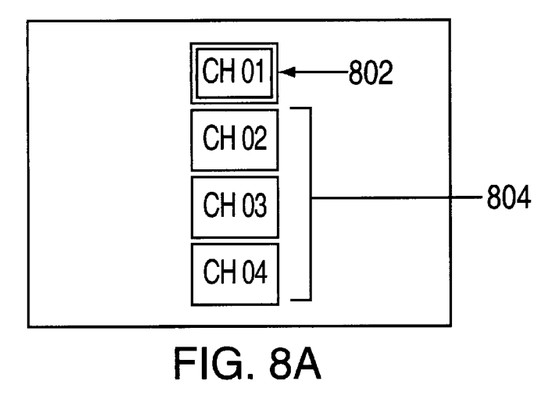
FIGS. 8A–D are illustrative diagrams showing additional embodiments of sequential arrangements of channel information locations used to preview channels in accordance with the present invention
Figure 8B:
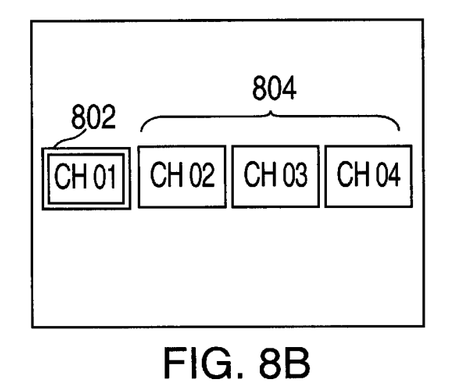
Figure 8C:
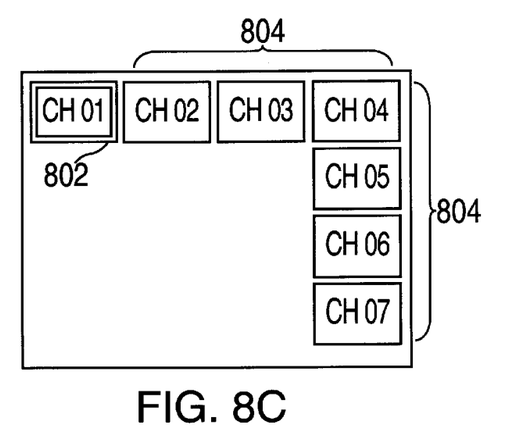
Figure 8D:
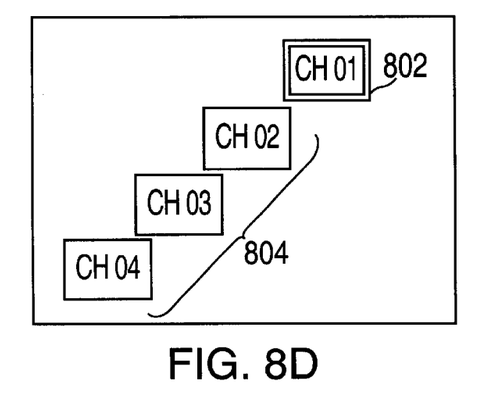

Referring now to FIGS. 8A–8D, other sequential configurations of channel ad, information locations can be provided on a preview mode display 800. Specifically, FIG. 8A illustrates a vertical formation, with the main channel location 802 residing at the top of the vertical arrangement, and the remaining channel locations 804 residing thereunder. Alternatively, FIG. 8B shows a horizontal arrangement with the main channel location 802 at the left side, FIG. 8C shows a hybrid arrangement with the main channel location 802 residing at the left side of the horizontal portion of the arrangement, and FIG. 8D shows a diagonal arrangement with the main channel location 802 residing at the top right.

Thus, methods and apparatuses for displaying information corresponding to previewed channels is provided in accordance with the present invention. Although the present invention has been described in considerable detail with reference to certain embodiments thereof, other embodiments are possible. For example, although certain specific information (e.g., channel number, logo, program name, audio, video) is described in connection with various channel preview rates, and certain channel preview rate breakdowns (e.g., slow, medium, fast) and criteria (e.g., jog dial position) are described, myriad alternatives may be provided without departing from the scope of the present invention (e.g., different information categories, different available rates, different controls). Additionally, although the arc and other sequential embodiments are described, other embodiments will become apparent to the ordinarily skilled artisan once instructed according to the present invention. Further, although certain sequences are illustrated, it will be understood that channels may be shown out of sequence or in the reverse sequence. Therefore, the spirit and scope of the appended claims should not be limited to the description of the embodiments contained herein.

What is claimed is:

1. A method for displaying information corresponding to previewed channels, the method comprising:

displaying a plurality of channel information locations in a sequential arrangement, the plurality of channel information locations including a main channel location and a plurality of remaining channel locations, wherein the sequential arrangement comprises an arc wherein the main channel position resides at a location along the arc;

displaying information for a first channel in the main channel location and information for a second channel in a first remaining channel location;

responsive to a first control signal, causing the information for the second channel to rotate into the main channel location and the information for the first channel to rotate out of the main channel location, wherein the information for the first channel rotates into a second remaining channel location when it rotates out of the main channel location; and responsive to a second control signal, causing the information for a third channel to rotate into the main channel location, the information for the first channel to rotate into a third remaining channel location, and the information for the second channel to rotate into the second remaining channel location.

2. The method of claim 1, for use with a remote control, wherein the first control signal is produced responsive to a first position of a jog dial on the remote control.

3. The method of claim 2, for use with the remote control, wherein the first control signal and the second control signal are produced when the jog dial on the remote control remains in the first position.

4. The method of claim 1, wherein the remaining channel locations are at first and second sides of the arc separated by the main channel position, such that channels to be previewed rotate from the first side of the arc, then to the main channel position for previewing, and then to the second side of the arc after they have been previewed.

5. The method of claim 1, for use with a remote control, wherein rotating the jog dial clockwise causes the previewed channels to rotate clockwise along the arc.

6. The method of claim 5, wherein rotating the jog dial counter-clockwise from the default position causes the previewed channels to rotate counter-clockwise along the arc.

7. The method of claim 1, wherein the first, second and third channels are from the set of all available channels.

8. The method of claim 1, wherein the first, second and third channels are from a subset of all available channels.

9. The method of claim 1, wherein audio and video are provided for the channel in the main channel location, and a still image is provided for the channels in the remaining channel locations.

10. An apparatus for displaying information corresponding to previewed channels, the apparatus comprising:

a channel index module, which provides a list of channels including a first channel and a second channel; and a preview display module, which displays a plurality of channel information locations in a sequential arrangement, the plurality of channel information locations including a main channel location a plurality of remaining channel locations; displays information for a first channel in the main channel location and information for a second channel in a first remaining channel location; and, responsive to a first control signal, causes the information for the second channel to rotate into the main channel location and the information for the first channel to rotate out of the main channel location.

11. The apparatus of claim 10, wherein the information for the first channel rotates into a second remaining channel location when it rotates out of the main channel location.

12. The apparatus of claim 11, wherein the preview display module responds to receiving a second control signal by causing the information for a third channel to rotate into the main channel location, the information for the first channel to rotate into a third remaining channel location, and the information for the second channel to rotate into the second remaining channel location.

13. The apparatus of claim 12, for use with a remote control, wherein the first control signal and the second control signal are produced when a jog dial on the remote control remains in a first position.

14. The apparatus of claim 12, wherein the sequential arrangement comprises an arc wherein the main channel position resides at a location along the arc.

15. The apparatus of claim 14, wherein the remaining channel locations are at first and second sides of the arc separated by the main channel position, such that channels to be previewed rotate from the first side of the arc, then to the main channel position for previewing, and then to the second side of the arc after they have been previewed.

16. The apparatus of claim 14, for use with a remote control, wherein rotating the jog dial clockwise causes the previewed channels to rotate clockwise along the arc.

17. The apparatus of claim 14, wherein rotating the jog dial counter-clockwise from the default position causes the previewed channels to rotate counter-clockwise along the arc.

18. The apparatus of claim 14, wherein audio and video are provided for the channel in the main channel location, and a still image is provided for the channels in the remaining channel locations.

19. The apparatus of claim 12, wherein the first, second and third channels are a sequence in the set of all channels that are available for viewing in a television system.

20. The apparatus of claim 12, wherein the first, second and third channels are from a subset of all channels that are available for viewing in a television system.

* * * * *